Dec. 29, 1925.

L. R. FOSTER 1,567,796

AUTOMOBILE JACK

Filed July 20, 1922    3 Sheets-Sheet 1

Dec. 29, 1925.
L. R. FOSTER
AUTOMOBILE JACK
Filed July 20, 1922
1,567,796
3 Sheets-Sheet 2
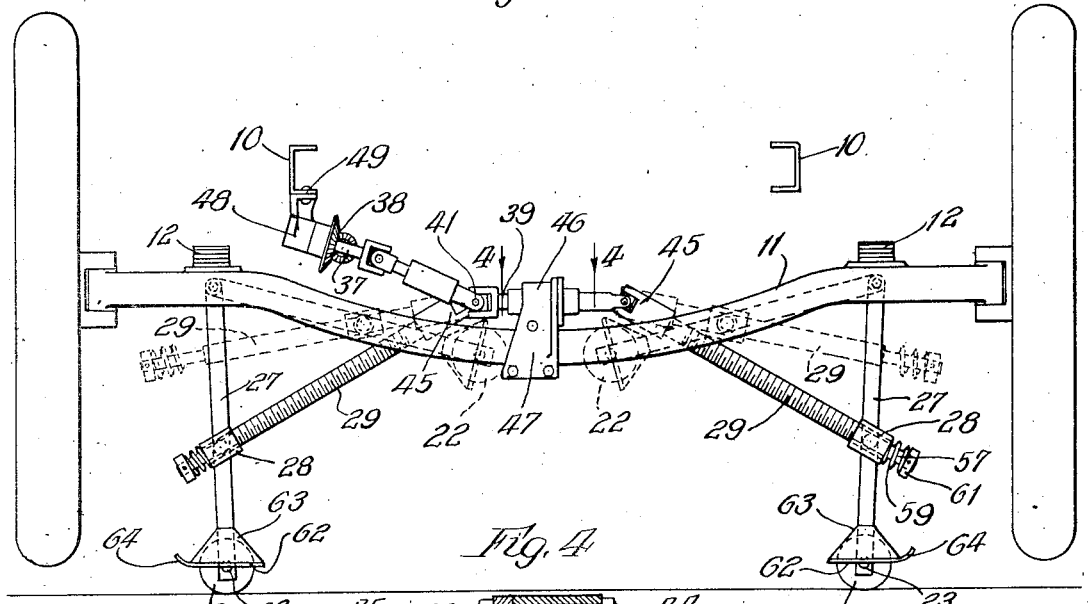
Fig. 2
Fig. 4
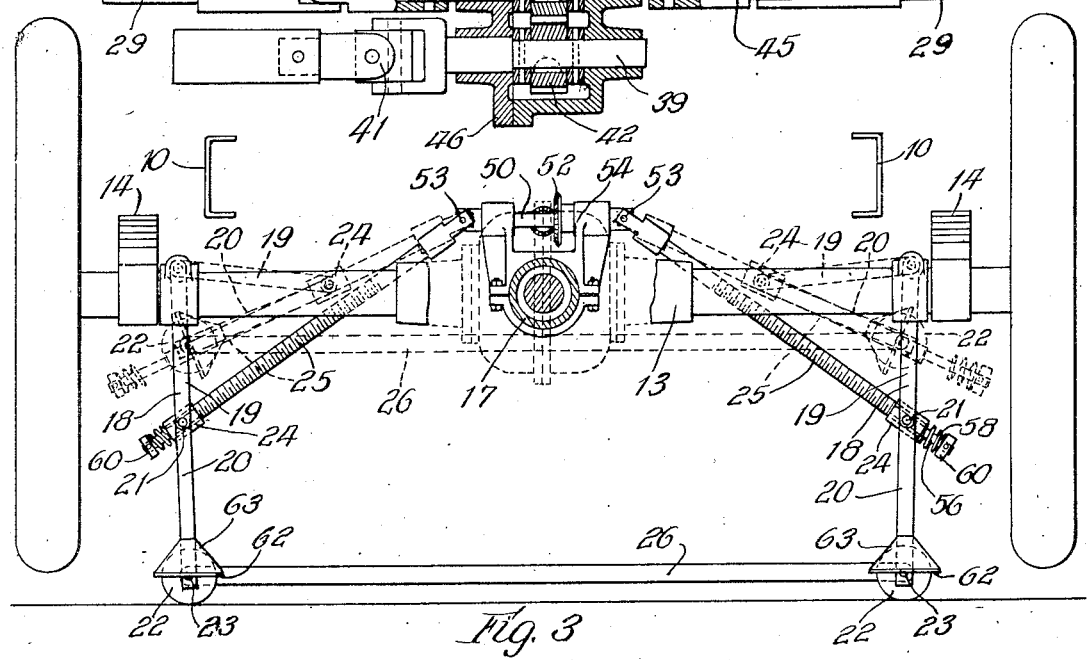
Fig. 3
Inventor:
Lawrence R. Foster
By: Wm O. Bell
Atty.

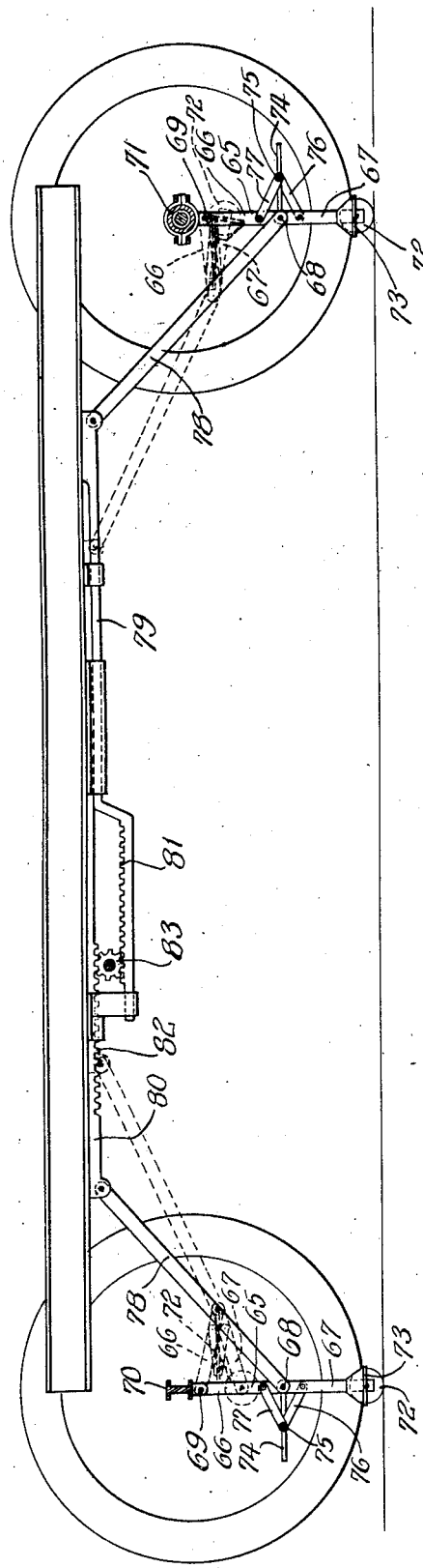

Patented Dec. 29, 1925.

1,567,796

UNITED STATES PATENT OFFICE.

LAWRENCE R. FOSTER, OF ROCK ISLAND, ILLINOIS.

AUTOMOBILE JACK.

Application filed July 20, 1922. Serial No. 576,237.

*To all whom it may concern:*

Be it known that I, LAWRENCE R. FOSTER, a citizen of the United States, residing at Rock Island, in the county of Rock Island and State of Illinois, have invented certain new and useful Improvements in Automobile Jacks, of which the following is a specification.

This invention relates to motor driven vehicles and has for its principal object to equip such vehicles with permanently attached jacks adapted to be operated by the propelling force of the vehicle so that any required elevation or jacking of the vehicle may be accomplished by the driving power without material manual exertion.

A further object of the invention is to provide a motor driven vehicle with a plurality of jacks adapted to be operated by the driving power of the vehicle and so arranged that they may be used to raise the vehicle off the ground or road when it is desired to leave it temporarily and thus effectually lock it against unauthorized operation.

A further object of the invention is to provide a motor vehicle with a plurality of jacks attached to the chassis at points adjacent to the sides so as to give the vehicle a very firm support when it is held in raised position by the jacks.

A further object of the invention is to provide a motor vehicle with power operated jacks which embody the principle of toggles whereby the maximum advantage is gained during the period of maximum work.

A further object of the invention is to provide means for automatically disconnecting the jacks from the power mechanism so as to prevent the jacks from being operated beyond the desired positions regardless of whether the power is stopped or continued.

Further objects and advantages of the invention will become apparent as the description is read in connection with the accompanying drawings illustrating selected embodiments of the invention, and in which Fig. 1 is a plan view showing four jacks applied to the chassis of one well known make of motor vehicle;

Figs. 2 and 3 are elevations of the opposite ends of such a vehicle;

Fig. 4 is a fragmentary sectional view taken on the line 4—4 of Fig. 2; and

Fig. 5 is a side elevation illustrating an alternative form of the invention.

Figure 1:
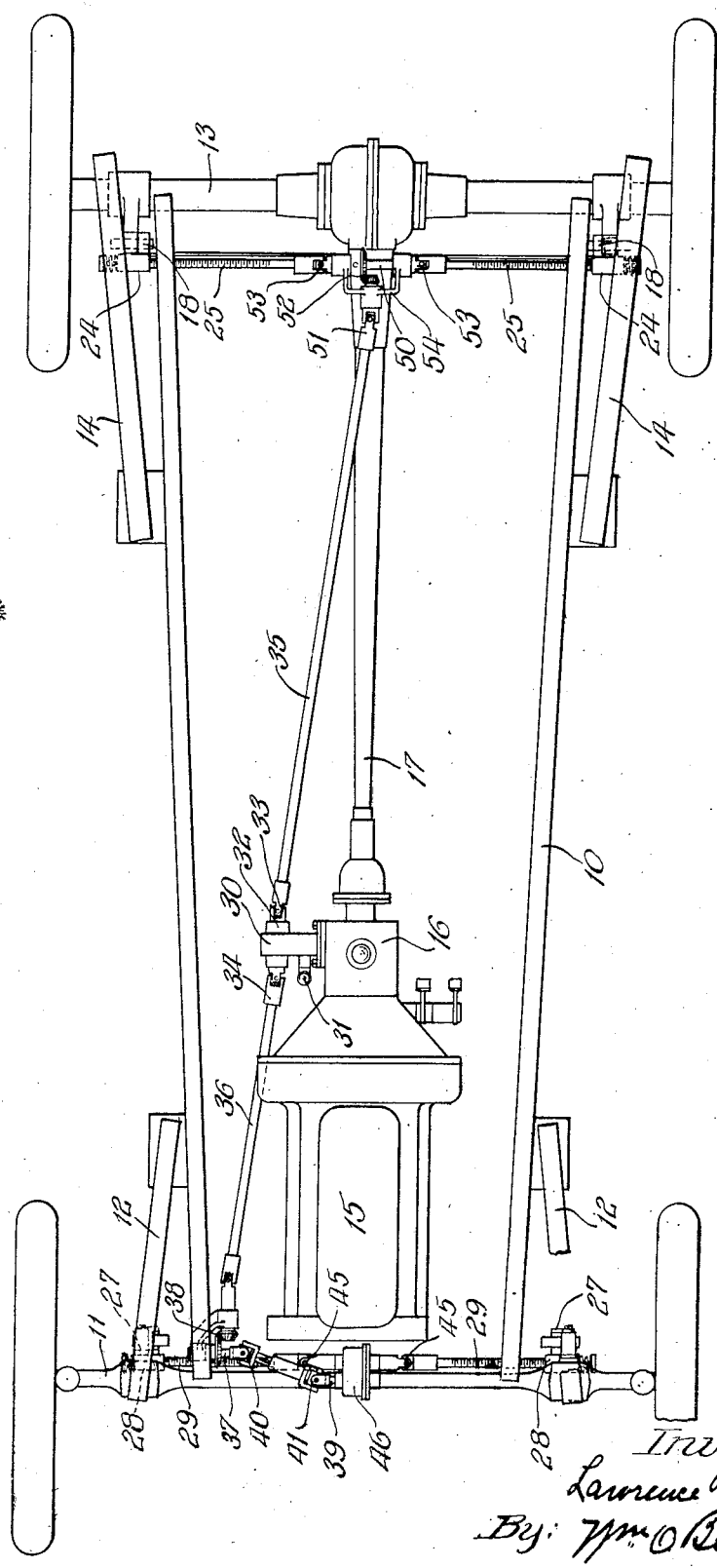

Referring to Figs. 1, 2, 3 and 4, 10 indicates the frame of the chassis which is connected to the front axle 11 by springs 12 and to the rear axle 13 by springs 14 arranged in the well known manner. The motor 15 is suitably supported on the frame and is equipped with a transmission 16 through which it drives a propeller shaft in the torque tube 17 leading to the driving shaft of the rear axle.

Pivotally connected to the rear end of the chassis in any suitable manner are a pair of jacks 18 here shown as including upper arms 19 and lower arms 20 pivoted together at 21 to form a knee joint. I have used channel iron in making these arms because it gives the desired rigidity with a minimum of weight and lends itself readily to the formation of joints. The manner of connecting these jacks to the chassis will vary greatly with different chassis, and I have therefore omitted the details of these connections for it is sufficient for the purpose of this invention if the strong pivoted joint is made with a suitable part of the chassis. It is particularly desirable, however, that the points of connection between the jacks and the chassis be close to the sides so as to give the vehicle a firm support on a broad base when it is supported by the jacks. The lower ends of the arms 20 are forked and receive the wheels or rollers 22 journaled on transverse axles 23 supported in the flanges of the channels. At the knee joints 21 are pivotally mounted nuts 24 which cooperate with screws 25 to straighten and bend the toggles in lowering and raising the jacks. A spreader bar 26 is connected to the arms 20 so as to maintain the lower ends at substantially a fixed distance and permit the toggles to be folded to the position indicated in dotted lines in Fig. 3.

The jacks at the front end of the chassis may be similar to those just described, but I prefer to make them of single toggle arms 27 arranged to operate like the upper halves of the rear jacks. These arms 27 are pivoted to the front end of the chassis in any suitable manner and at any suitable points, but preferably at points adjacent to the sides thereof. These arms are also equipped with wheels or rollers 22 carried by axles 23 like those on the rear jacks. At a suitable point on the arms 27 and preferably between the middle and the lower ends, I pivot nuts 28 similar to nuts 24 which cooperate with screws 29 similar to screws 25 to swing the jacks the positions shown in solid lines to those shown in dotted lines and back again as may be desired.

The screws 25 and 29 may be driven in a variety of ways and I have illustrated one construction that is very satisfactory in service. This includes an auxiliary transmission 30 secured to the side of the transmission 16 and equipped with gearing adapted to be engaged with gears in the transmission 16 to drive forward or backward as the case may be. This gearing is controlled by a lever 31 and as the details are of no importance they have been omitted. This auxiliary transmission serves to provide a shaft 32 which is connected by universal joints 33 and 34 with longitudinally extending shafts 35 and 36. The shaft 36 drives a transverse shaft 37 through beveled gears 38 and this shaft in turn drives a shaft 39 through universal joints 40 and 41 and a suitable sliding joint. A gear 42 on the shaft 39 drives a gear 43 carried by a shaft 44 which is connected by suitable universal joints 45 with the screws 29. As shown, the shafts 39 and 44 are carried in a suitable housing 46 secured to the front axle at 47 and the shaft 37 is journalled in a bracket 48 secured to the frame at 49. The details of these features, however, are not of the essence of the invention, and may be varied to suit particular conditions and in individual tastes.

The shaft 35 drives a transverse shaft 50 through a universal joint 51 and beveled gears 52 and this shaft in turn drives the screws 25 through universal joints 53. As shown, the shaft 50 is carried by a suitable bracket 54 clamped on the rear end of the torque tube 17.

The arrangement of this mechanism is such that when the clutch is thrown out and the lever 31 is moved in one direction, gearing will be engaged to drive the shafts 35 and 36 in the proper direction to make the worms 29 and 25 straighten the toggles forming the jacks and raise the vehicle, and by releasing the clutch and moving the lever 31 in the opposite direction beyond the neutral position, gearing may be engaged to reverse the operation of the screws 25 and 29 lowering the vehicle and returning the jacks to the folded positions indicated in dotted lines in Figs. 2 and 3.

In order to prevent the jacks from being moved beyond the solid line positions shown in Figs. 2 and 3 by a failure of the operator to shut off the power or disengage the gears, I provide the screws 25 and 29 with reduced unthreaded portions 56 and 57 on which the nuts 24 and 28 ride when the jacks reach their extreme height, so that the screws may continue to rotate without moving the jacks any further. These reduced portions are equipped with springs 58 and 59 and collars 60 and 61 arranged so that the springs are compressed by the movement of the nuts to the positions shown in solid lines, so that upon reversing the screws the nuts will be forced to re-engage the threads on the screws and permit the jacks to be moved to the dotted line positions. A similar arrangement of unthreaded portions and springs may be made at the opposite ends of the screws to prevent the jacks from moving beyond the proper limits in folding, but for the sake of clearness, I have omitted specific illustration.

The rollers 22 will afford very convenient support for the vehicle when it is resting on a hard surface but they will have a tendency to sink into soft ground, and to take care of this emergency I prefer to provide the jacks with suitable floats 62 here illustrated in the form of plates secured to the channel bars by welding or riveting and braced by suitable gussets 63. The size of these plates will of course depend upon the weight of the vehicle, but they can be made sufficiently broad to support the vehicle in relatively soft ground without being of any great weight, and where the chassis includes some parts that normally interfere with the plates in folding, suitable notches can be made or the supports may be pivoted to permit the desired folding.

In the case of the jacks including only a single toggle arm, like those shown at 27, the floats may be provided with curved edges 64 to prevent them from cutting into the ground and to permit them to function like a runner as the half toggles straighten.

It will become apparent from the above description and illustration that I have provided jacks so located as to afford a broad stable support for the vehicle, and that by using jacks embodying toggle movement, the greatest mechanical advantage is had at the time when the vehicle is actually being raised and the poorest mechanical advantage is had when the only work to be accomplished is the folding of the jacks.

While I prefer to use the organization shown, it will be obvious that where preferred, jacks may be applied at only one end of the vehicle.

In Fig. 5 I have illustrated a modified form and shown it with a different type of chassis. In this alternative embodiment, the jacks 65 include toggle arms 66 and 67 pivoted at 68 to form a knee joint in much the same manner as illustrated in Fig. 3. The upper ends of the arm 66 are suitably pivoted at 69 to the axles 70 and 71. The lower ends of the arms 67 are equipped with rollers 72 and floats 73 similar to those previously described. A rod 74 is pivotedly connected to the toggles at 68 and passes freely through a block 75 to which is pivoted a pair of levers 76 and 77. The toggles are operated by links 78 driven in any suitable manner from the driving power of the vehicle. When the links 78 are drawn towards the center of the vehicle, they will tend to swing the pivots 68 through an arc having its center in the axis of the pivots 69. This swinging movement of the arms 66 will cause the links 77 to force the block 75 towards the free end of the rod 74 which will make the link 76 swing the arm 67 about the pivot 68, and if the movement of the link 78 is continued, the parts will be given the position shown in dotted lines. The reverse movement of the links 78 will reverse the movement of the parts, lower the wheels 72 and floats 73 and set the jacks in the solid line position shown in Fig. 5. This folding movement has the advantage of permitting links 78 to completely fold the toggles without requiring a spreader bar similar to that used in Fig. 3. The wheels 72 move from the dotted to the solid line position along substantially vertical lines and the toggle is most advantageous during the period when it is actually raising the vehicle.

The links 78 may be operated in a variety of ways and I have shown them connected and with suitable reciprocating rods 79 and 80 equipped with racks 81 and 82 meshing with a pinion 83 that may be driven in any suitable manner from the power of the vehicle.

This and other alternative forms, which will readily be devised by those skilled in the art, possesses the advantages of the preferred form and will attain the objects of the invention in a very suitable manner.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims:

I claim:

1. In a motor vehicle, the combination of a chassis, jacks pivotally connected to the chassis at points adjacent to each side thereof, each jack including a toggle arm mounted to swing transversely to the chassis, and means adapted to be driven by the motor of the vehicle for swinging said arms to raise and lower said chassis.

2. In a motor vehicle, the combination of a chassis, jacks pivotally connected to the chassis, each jack including a toggle arm mounted to swing transversely of the chassis, means to operate said jack and adapted to be driven from the motor of the vehicle, and means for automatically limiting the operation of said arms by said motor driven means.

3. In a motor vehicle, the combination of a chassis, jacks pivotally connected to the chassis and each including a toggle arm, a nut pivotally connected with said toggle arm, a screw having threads for cooperation with said nut, and a reduced portion of smaller diameter than said threads, and means for driving said screw.

4. In a motor vehicle, the combination of a chassis, jacks connected with said chassis and each including a toggle arm, a nut pivoted to said toggle arm, a motor driven screw cooperating with said nut, said screw having a reduced portion to receive said nut, and a spring adjacent to said reduced portion to force said nut into engagement with the threads of the screw.

5. In a motor vehicle, the combination of a chassis, a pair of jacks mounted on said chassis, each jack including an upper toggle arm pivotally mounted on said chassis, a lower toggle arm pivoted to said upper arm to form a knee joint, ground engaging means on said lower arm, means connecting said ground engaging means on the respective jacks to hold them in spaced relation, and means to swing said knee joint toward and from the chassis to raise and lower the ground engaging means.

6. In a motor vehicle, the combination of a chassis, a plurality of jacks pivoted thereon and mounted to swing transversely thereof, a rotating shaft supported on the chassis, screws driven by said shaft and operatively connected with said jacks to raise and lower the same, and means for driving said shaft.

LAWRENCE R. FOSTER.